United States Patent Office 2,978,514
Patented Apr. 4, 1961

2,978,514

SEPARATION OF PENTAERYTHRITOL AND DIPENTAERYTHRITOL FROM SOLUTION

Arthur J. Poynton, Mount Royal, Quebec, Canada, assignor to Canadian Chemical Company, Ltd., Montreal, Quebec, Canada, a corporation of Canada No Drawing. Filed Dec. 9, 1957, Ser. No. 701,361

3 Claims. (Cl. 260—615)

This invention relates to pentaerythritol.

Pentaerythritol is commonly produced by the reaction of formaldehyde, acetaldehyde and an alkali such as calcium hydroxide or sodium hydroxide. As a byproduct there is obtained the formic acid salt of the alkali employed, e. g. calcium formate or sodium formate. There are also obtained certain pentaerythritol derivatives, such as dipentaerythritol and formals of pentaerythritol, and other organic compounds which are difficult to remove from the pentaerythritol.

It is an object of this invention to provide a novel process for the purification of pentaerythritol.

Other objects of this invention will be apparent from the following detailed description and claims. In this description all proportions are by weight unless otherwise indicated.

According to one aspect of this invention crude pentaerythritol containing pentaerythritol formals, such as dipentaerythritol formal, is treated, in aqueous solution, with hot dilute aqueous sulfuric acid and with activated charcoal. The action of the hot sulfuric acid eliminates the pentaerythritol formals, hydrolyzing them to form pentaerythritol and formaldehyde. The charcoal treatment greatly improves the color of the product and decreases its color-forming tendencies. Surprisingly, it is essential that the charcoal be in contact with the aqueous solution of pentaerythritol during or after the treatment with sulfuric acid. If the aqueous solution of crude pentaerythritol is treated with charcoal prior to the treatment with sulfuric acid, the desired results, i.e. improvement in color and the decrease in color-forming tendencies, are not obtained.

The crude pentaerythritol to which the process of this invention is most usefully applied is one obtained by the condensation of formaldehyde (which is added in excess) with acetaldehyde and sodium hydroxide in aqueous medium, to produce (after suitable intermediate treatments, including addition of an acidic material to neutralize the mixture, and distillation of excess formaldehyde and of part of the water) a solution containing pentaerythritol and sodium formate, followed by crystallization of the crude pentaerythritol from this solution. One suitable method of manufacture of this crude, unrecrystallized, pentaerythritol is disclosed in the U.S. patent to Mitchell et al. No. 2,790,836. This crude pentaerythritol contains small amounts, e.g. up to 6% (on a dry basis) of polypentaerythritols (including dipentaerythritol) as well as pentaerythritol formals. The sulfuric acid treatment may be applied to this crude pentaerythritol by incorporating the crude pentaerythritol into a hot aqueous solution containing the acid. This may be done, for example, by dissolving the crude pentaerythritol in the water and then adding the acid or by dissolving the crude pentaerythritol in hot acidulated water. The proportion of sulfuric acid should be in excess of one mole per mole of sodium formate present. Preferably, when the crude pentaerythritol contains less than about 1% sodium formate and the concentration of crude pentaerythritol in the solution is about 35–45%, the $H_2SO_4$ concentration is in the range of 0.2 to 0.6%. Optimum results are attained at a pH of about 2.2. To facilitate subsequent recovery of the pentaerythritol and to minimize the size of the equipment and the amount of acid necessary, the concentration of the crude pentaerythritol in the solution should be rather high, e.g. in the range of about 35–45% previously mentioned, preferably about 40%. The temperature at which this treatment is carried out is preferably in the range of about 95 or 100 to 105° C. It is most convenient to operate at about the boiling point of the acidic solution being treated. The time of treatment should be above about 20 minutes, preferably about 30 to 120 minutes.

The charcoal treatment is preferably effected by mixing powdered charcoal with the acidic pentaerythritol solution during the sulfuric acid treatment. It is found that, surprisingly, the presence of the charcoal practically eliminates the tendency for the sulfuric acid to corrode the stainless steel (e.g. type 316 stainless steel) vessels in which such treatment may be carried out. However, the charcoal may be added after the sulfuric acid treatment, and, if desired, the sulfuric acid may be neutralized prior to the addition of the charcoal. The amount of charcoal may be quite small, very good results having been attained with the proportions in the range of about 0.2 to 0.5% based on the weight of the crude pentaerythritol. The solution is maintained hot during the treatment with charcoal, preferably in the range of about 95 or 100 to 105° C. It is most convenient to operate at about the boiling point of the solution. During the charcoal treatment it is desirable to agitate the mixture to promote contact between the charcoal and all parts of the solution. The time of contact of the charcoal and the solution may be, for example, in the range of about 10 to 120 minutes. At the conclusion of the treatment the charcoal may be removed in any suitable manner, as by filtration.

After the charcoal treatment the pentaerythritol solution is preferably cooled to effect recrystallization of the pentaerythritol therefrom. One convenient method involves the use of the well known adiabatic crystallizer wherein the solution is placed under a subatmospheric pressure to cause evaporation of water therefrom to an extent sufficient to reduce the temperature of the solution to the desired value.

After the treatment with charcoal the acidic pentaerythritol solution may be neutralized, if desired, prior to cooling and crystallization. Thus, an alkaline material, such as sodium hydroxide or sodium carbonate, may be added to raise the pH of the solution to about 5 to 8.

When the crude pentaerythritol contains less than about 10% of polypentaerythritols, it is found that cooling of solution resulting from the acid treatment, with or without charcoal treatment, results in large bipyramid crystals of pentaerythritol. It is also found that the dipentaerythritol present in the solution can be crystallized out in the form of much smaller crystals and that this difference in crystal size may be employed for recovering the pentaerythritol and dipentaerythritol separately from the same solution. Thus, the mixture of crystals and solution resulting from the cooling step may be filtered through a screen whose apertures are of sufficient size to permit the fine dipentaerythritol crystals (which are mainly smaller than 10 microns in diameter) and solution to pass through, while retaining the crystals of monopentaerythritol. For example, a 100 to 325 mesh screen may be employed, with the mixture being forced onto the screen by centrifugal action, and the fine dipentaerythritol crystals can then be recovered from the liquid by conventional elutriation procedures. This separation of pentaerythritol and dipentaerythritol by conjoint crystallization, after acid treatment, followed by crystal separation, constitutes another aspect of my invention. It is particularly effective when applied to a mixture of pentaerythritol and dipentaerythritol containing about 2 to 5 or 6% dipentaerythritol.

For many purposes, consumers of pentaerythritol desire a so called "technical grade" product having a relatively high polypentaerythritol content, e.g. about 12 to 20% polypentaerythritols, principally dipentaerythritols. For example, in the manufacture of certain oil-modified alkyd resins using pentaerythritol as the polyhydric alcohol, an increase in the proportion of the polypentaerythritol shortens the cooking time necessary to produce the alkyd resin. In accordance with another aspect of this invention, there are obtained from a single pentaerythritol-forming reaction system two separate grades of pentaerythritol, one having a low polypentaerythritol content (below 3% polypentaerythritol, based on dry weight) and the other having a relatively high polypentaerythritol content (about 12 to 20% polypentaerythritols or higher). This result is obtained by a modification of the reaction system described in the aforesaid Mitchell et al. patent, and by a fractional crystallization of the product, either in the first crystallization or, preferably, in the recrystallization. The reaction system described in the Mitchell et al. patent may be modified so as to increase the proportion of polypentaerythritol produced therein by decreasing the ratio of formaldehyde to acetaldehyde, e.g. to about 6 or 6.5 to 8.0 moles of formaldehyde per mole of acetaldehyde, and by preheating the reactants, e.g. to a temperature of about 25 to 35° C. so that the peak reaction temperature rises to about 65 or 75 to 90° C. The pentaerythritol and polypentaerythritol product of such a reaction system will contain an appreciable amount of polypentaerythritols, i.e., about 8 to 12% polypentaerythritols, based on dry weight. The crude product may be crystallized from the reaction mixture containing all the sodium formate, after which this crude pentaerythritol product may be washed, redissolved at an elevated temperature, and fractionally recrystallized, at two different temperatures, to produce two crops of crystals, one low in polypentaerythritols and the other high in polypentaerythritols. Preferably, before fractional recrystallization, the solution of the crude pentaerythritol is given a sulfuric acid treatment and a charcoal treatment in the manner described previously. The first stage of recrystallization, to produce the first crop, high in pentaerythritol and containing less than 3% polypentaerythritols, may be effected by cooling, as to 70 to 85° C. Alternatively, a first crop of exceptionally high quality may be obtained by evaporating water from the hot solution (e.g. by evaporating at about 103° C. at atmospheric pressure), the evaporation being continued until the polypentaerythritol content of the precipitate reaches the desired upper limit, e.g. 2 or 3%. The first crop is then collected and removed from the solution and the solution is cooled, e.g. to 5 to 20° C., to produce the second crop, having a polypentaerythritol content of 12 to 20% or higher. The ratio of the two crops can be varied, as desired, by changing the temperature of crystallization or the extent to which the evaporation step is carried out.

The following examples are given to illustrate this invention further.

*Example I*

Acetaldehyde, sodium hydroxide (as a 20% aqueous solution) and formaldehyde (as a 20% aqueous solution) were mixed rapidly, with agitation, in the proportions of 7.5 moles formaldehyde, 1.0 mole acetaldehyde, and 1.1 mole sodium hydroxide and then passed continuously through a reaction zone. The reactants were preheated to a temperature of 30° C. and reached a peak temperature, due to their exothermic reaction, of 72° C. On emerging from the reaction zone, after a 40 minute residence time, the reaction mixture was neutralized to pH of 5.5 to 6.5 with acetic acid and then passed to a distillation zone, where unreacted formaldehyde and some water were stripped off, and then to an evaporator where the solution was concentrated until its boiling point (at an atmospheric pressure of 710 mm. Hg) was 110° C. and the ratio of water to sodium formate therein was 100/55. The resulting concentrated solution was cooled, at the rate of 0.5° C. per minute, to a temperature of 5° C. to produce crystals, which were washed with 1 part water at 5° C. per part of crystals, the washings being recycled to the evaporator. These crude washed pentaerythritol crystals were dissolved in hot water to produce a 40% solution to which $H_2SO_4$ was added, the amount of $H_2SO_4$ being 0.6% of the resulting solution. The acidic solution was heated for four hours at its boiling point (105° C.) after which 0.5%, based on the weight of said crude crystals, of powdered activated charcoal ("Norit") was added, the mixture being stirred with said charcoal for 15 minutes at 105° C. The charcoal was then removed by filtration and the solution was cooled, at a rate of 0.5° C. per minute, to 70 C. to produce a first corp of crystals, which was recovered in centrifuge preheated to at least 70° C. followed by washing of said first crop with an equal weight of water at 70° C., the washings being recycled to the evaporator. The mother liquor from this last crystallization was then heated to 80° C. and cooled at the rate of 0.5° C. per minute to a temperature of 5° C. to produce a second crop of crystals, which was recovered by centrifuging, followed by washing with an equal weight of water at 5° C., the resulting mother liquor and washings being recycled to the evaporator. The first crop crystals had a hydroxyl content of 49.4%, a polypentaerythritol content in the neighborhood of 2.5% and a neglible content of formals (all on a dry basis), while the polypentaerythritol content of the second crop was about 15%. Comparison of the color of the product with that of a product obtained in the same way, except that the charcoal treatment was omitted, gave the following data:

| | First Crop Acid and Charcoal Treated | First Crop Acid treated no charcoal | Second Crop | |
|---|---|---|---|---|
| | | | Acid and Charcoal | Acid Only |
| $H_2SO_4$ color-cold | less than 1 | 1½ | 2 | 3½ |
| $H_2SO_4$ color-hot | 2½ | 3½ | 5½ | 7 |
| Natural color A.P.H.A. | 5 | 10–15 | less than 5 | 15 to 20 |

*Example II*

Crude unrecrystallized pentaerythritol crystals, obtained in the manner described in the above-mentioned Mitchell et al. patent, and containing about 5% dipentaerythritol and 6% of pentaerythritol formals, and 0.44% sodium formate (all on a dry basis) were dissolved in hot water to produce a 40% solution. This solution was filtered, acidulated with 0.6% based on the weight of solution of $H_2SO_4$ and heated at its boiling point (105° C.) for four hours, at which time the pH was 2.2. Powered activated charcoal ("Norit") was then added, in the amount of 0.5% of the weight of the crude crystals, the temperature was maintained at 105° C. for 15 more minutes, and, after removal of the charcoal, the solution was cooled at the rate of 0.5° C. per minute, while stirring. Above 40° C. the entire mass became milky. The mixture was cooled until its temperature was 5° C. and was then centrifugally filtered to isolate the large crystals, the fines passing through the filter medium. Analysis of the fines showed them to be dipentaerythritol of better than 90% purity. The fines were small enough to pass through a 325 mesh screen, while more than 98% of the large crystals were retained on a 100 mesh screen and less than 0.5% of these crystals would pass through a 200 mesh screen. The isolated large crystals were washed and dried. Comparison of these crystals with those of crystals obtained in a similar manner, except that the charcoal treatment was omitted, gave the following data:

|  | Acid and Charcoal Treated | Acid-treated |
|---|---|---|
| H₂SO₄ color-cold | 1 | 2½ |
| H₂SO₄ color-hot | 2 | 4 |
| Natural color A.P.H.A | 5 | 20 |
| Formals (percent) | 0.1 | 0.1 |
| Hydroxyl content (percent) | 49.7 | 49.7 |

The washings and mother liquor were combined and cooled to a temperature of 20° C. to produce a second crop of crystals, which after washing and drying had a polypentaerythritol content of 14.1%.

*Example III*

Example II was repeated except that the concentration of H₂SO₄ was 0.5% (based on the weight of solution), the amount of charcoal was 0.2%, and the charcoal was added with the H₂SO₄, the whole being heated to 105° C. for one hour in a vessel of type 316 stainless steel. The product had the following color characteristics: Natural color A.P.H.A., less than 5; H₂SO₄ color-cold, 1; H₂SO₄ color-hot, 3.

In each of the above examples, the entire process, with the exception of the formaldehyde-distillation and evaporation steps, was conducted substantially at an atmospheric pressure of 710 mm. Hg.

Although the preceding description has been restricted to sulfuric acid as the treating acid, it should be understood that sulfuric acid may be replaced in equivalent amounts by other strong acids such as hydrochloric.

It is to be understood that the foregoing detailed description is given merely by way of illustration and that many variations may be made therein without departing from the spirit of my invention.

Having described my invention, what I desire to secure by Letters Patent is:

1. Process for the separation of pentaerythritol and dipentaerythritol from a crude pentaerythritol, produced in the reaction of formaldehyde, acetaldehyde and an alkali and containing dipentaerythritol and pentaerythritol formals, which comprises maintaining a solution of said crude pentaerythritol in acidulated water, in which said crude pentaerythritol is wholly dissolved and is at a concentration of about 35 to 45% and in which at least 0.2% of sulfuric acid is present, at an elevated temperature between about 95° and 105° C. for a period of about 20 to 120 minutes to hydrolyze said formals, cooling the solution to form bipyramid crystals of pentaerythritol and smaller crystals of dipentaerythritol, separating bipyramid crystals from said cooled solution and said smaller crystals by filtration through apertures at least as large as those of a 325 mesh screen, and thereafter separating said smaller crystals of dipentaerythritol from said solution.

2. Process for the separation of pentaerythritol and dipentaerythritol from a crude pentaerythritol produced in the reaction of formaldehyde, acetaldehyde and an alkali and containing dipentaerythritol and pentaerythritol formals, which comprises maintaining a solution of said crude pentaerythritol in acidulated water, in which said crude pentaerythritol is wholly dissolved and is at a concentration of about 35 to 45% and in which from 0.2 to 0.6% of sulfuric acid and less than about 1% of sodium formate is present, at an elevated temperature between about 95° and 105° C. for a period of about 20 to 120 minutes to hydrolyze said formals, cooling the solution to form bipyramid crystals of pentaerythritol and smaller crystals of dipentaerythritol, separating bipyramid crystals from said cooled solution and said smaller crystals by filtration through apertures at least as large as those of a 325 mesh screen, and thereafter separating said smaller crystals of dipentaerythritol from said solution.

3. Process as set forth in claim 2 in which the pH of the acidic solution is about 2.2.

References Cited in the file of this patent

UNITED STATES PATENTS

| 2,223,421 | Hubacher et al. | Dec. 3, 1940 |
| 2,288,929 | Wyler | July 7, 1942 |
| 2,464,430 | Barth et al. | Mar. 15, 1949 |
| 2,790,836 | Mitchell et al. | Apr. 30, 1957 |
| 2,820,066 | Taylor | Jan. 14, 1958 |

FOREIGN PATENTS

| 440,691 | Great Britain | Jan. 3, 1936 |

OTHER REFERENCES

Gilman et al.: Organic Synthesis, Coll. vol. I, 2nd ed. (1951), pages 425–426.

Mantell: Adsorption, 2nd ed. (1951), pg. 113–115.

Ser. No. 300,984, Nagel et al. (A.C.P.), published July 13, 1943.